(12) United States Patent
Koishikawa

(10) Patent No.: US 9,649,887 B2
(45) Date of Patent: May 16, 2017

(54) PNEUMATIC TIRE

(71) Applicant: The Yokohama Rubber Co., LTD., Minato-ku, Tokyo (JP)

(72) Inventor: Yoshifumi Koishikawa, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/765,234

(22) PCT Filed: Jan. 28, 2014

(86) PCT No.: PCT/JP2014/051829
§ 371 (c)(1),
(2) Date: Jul. 31, 2015

(87) PCT Pub. No.: WO2014/119567
PCT Pub. Date: Aug. 7, 2014

(65) Prior Publication Data
US 2015/0375571 A1 Dec. 31, 2015

(30) Foreign Application Priority Data
Jan. 31, 2013 (JP) .................. 2013-017206

(51) Int. Cl.
*B60C 11/03* (2006.01)
*B60C 11/04* (2006.01)
*B60C 5/00* (2006.01)
*B60C 11/12* (2006.01)

(52) U.S. Cl.
CPC ............. *B60C 11/04* (2013.01); *B60C 5/00* (2013.01); *B60C 11/0306* (2013.04); *B60C 11/0318* (2013.04); *B60C 2011/0341* (2013.04); *B60C 2011/0381* (2013.04); *B60C 2011/0383* (2013.04); *B60C 2011/0388* (2013.04);
(Continued)

(58) Field of Classification Search
CPC ......... B60C 11/0318; B60C 2011/0325; B60C 2011/0381; B60C 2011/0383
See application file for complete search history.

(56) References Cited

U.S. PATENT DOCUMENTS 4,598,748 A   7/1986 Campos et al.
5,027,875 A * 7/1991 Kogure ............... B60C 11/0318
                                                    152/209.2
(Continued)

FOREIGN PATENT DOCUMENTS

CN   102398478 A  *  4/2012
EP   0 454 659        10/1991
(Continued)

OTHER PUBLICATIONS

Machine translation for Japan 07-276919 (no date).*
(Continued)

*Primary Examiner* — Steven D Maki
(74) *Attorney, Agent, or Firm* — Thorpe North & Western

(57) ABSTRACT

A pneumatic tire is provided where, in a tread center portion, there are at least three pitch variations in terms of pitch length in the circumferential direction of the tire, and, taking n as the pitch count, the pitch lengths Pc Pc1, Pc2, Pc3, . . . , Pcn in order from longest to shortest satisfy the relationships Pc1/Pc2≥Pc2/Pc3≥, . . . , ≥Pcn−1/Pcn and Pc1/Pc2>Pcn−1/Pcn.

16 Claims, 3 Drawing Sheets

(52) U.S. Cl.
CPC ............... *B60C 2011/0393* (2013.04); *B60C 2011/1209* (2013.04)

(56) References Cited

U.S. PATENT DOCUMENTS

| | | | | |
|---|---|---|---|---|
| 5,135,038 | A * | 8/1992 | Graas | B60C 11/0306 152/209.18 |
| 6,363,984 | B1 | 4/2002 | Morgan | |
| 2004/0093106 | A1 | 5/2004 | Stuckey | |
| 2007/0056664 | A1 * | 3/2007 | Suzuki | B60C 11/01 152/209.16 |
| 2010/0186861 | A1 * | 7/2010 | Ishiguro | B60C 11/0306 152/209.25 |
| 2010/0282385 | A1 | 11/2010 | Stuckey | |
| 2011/0240191 | A1 | 10/2011 | Sakamoto | |
| 2014/0137999 | A1 * | 5/2014 | Nishiwaki | B60C 11/0309 152/209.8 |
| 2014/0224393 | A1 | 8/2014 | Stuckey | |

FOREIGN PATENT DOCUMENTS

| | | |
|---|---|---|
| EP | 367557 B1 * | 1/1994 |
| JP | S59-190008 | 10/1984 |
| JP | 07-276919 A * | 10/1995 |
| JP | H11-217006 | 8/1999 |
| JP | H11-291714 | 10/1999 |
| JP | 2003-054222 | 2/2003 |
| JP | 2007-168572 | 7/2007 |
| JP | 2011-213348 | 10/2011 |
| WO | WO 2004-041555 | 5/2004 |
| WO | WO 2010-067699 | 6/2010 |

OTHER PUBLICATIONS

Machine translation for China 102398478 (no date).*
International Search Report for International Application No. PCT/JP2014/051829 dated Apr. 1, 2014, 3 pages, Japan.

* cited by examiner

PNEUMATIC TIRE

TECHNICAL FIELD

The present technology pertains to a pneumatic tire featuring pitch variations in its tread pattern.

BACKGROUND

Pneumatic tires featuring pitch variations in their tread patterns are known in the art (see, for example, Japanese Unexamined Patent Application Publication Nos. H11-291714A, 2011-213348A and 2007-168572A). Japanese Unexamined Patent Application Publication No. H11-291714A discloses a tire in which wet performance is improved via specific pitch lengths, lateral groove angles of inclination, and lateral groove areas. Japanese Unexamined Patent Application Publication No. 2011-213348A discloses a tire in which noise performance is improved via specific pitch ratios in a pitch sequence. Japanese Unexamined Patent Application Publication No. 2007-168572A discloses a tire in which noise performance is improved via specific pitch lengths and lateral groove widths.

In the tires disclosed in Japanese Unexamined Patent Application Publication Nos. H11-291714A and 2007-168572A, the angles of inclination or areas of the lateral grooves or the widths of the lateral grooves must also be specified in addition to the pitch length, resulting in a complicated design. Moreover, while these tires exhibit improved wet performance or noise performance, it is unclear whether they exhibit improvement in other types of performance, such as steering stability or rolling resistance on dry road surfaces.

In the tire disclosed in Japanese Unexamined Patent Application Publication No. 2011-213348A, only the pitch ratios between multiple pitches unambiguously determined by pitch length are specified. Therefore, although noise performance is improved by the incorporation of the pitch variations, which are intended to improve noise performance in the first place, it is unclear whether there is any improvement in steering stability or rolling resistance on dry road surfaces.

SUMMARY

The present technology provides a pneumatic tire that is obtained without modifying factors other than pitch length, such as lateral groove angle of inclination, area, or width, i.e., without the use of a complicated design and exhibits improved steering stability and rolling resistance on dry road surfaces.

The pneumatic tire according to the present technology is provided with at least two primary grooves that extend in a circumferential direction in a tire tread portion, and a plurality of tire widthwise directional grooves that intersect the primary grooves. The area to the inside of the tire widthwise directional center lines of the outermost main grooves with respect to the widthwise direction of the tire constitutes a tread center portion, and the areas from the tire widthwise directional center lines of the outermost main grooves with respect to the widthwise direction of the tire to tread end sections located to the outsides thereof in the widthwise direction of the tire constitute tread shoulder portions. The tread center portion comprises at least three pitch variations in terms of pitch length in the circumferential direction of the tire in an area constituted by the tire widthwise directional grooves and land portions adjacent to the tire widthwise directional grooves to one side in the circumferential direction of the tire. Taking n as the pitch count, the pitch lengths Pc Pc1, Pc2, Pc3, ..., Pcn in order from longest to shortest satisfy the relationships Pc1/Pc2≥Pc2/Pc3≥, ..., ≥Pcn−1/Pcn and Pc1/Pc2>Pcn−1/Pcn.

In the pneumatic tire according to the present technology, modifications are made to only pitch length ratios based on pitch length, and have not been made to factors other than pitch length. As a result, the pneumatic tire according to the present technology can be obtained without relying upon a complicated design, and allows for improved steering stability and rolling resistance on dry road surfaces.

DETAILED DESCRIPTION

Figure 1:
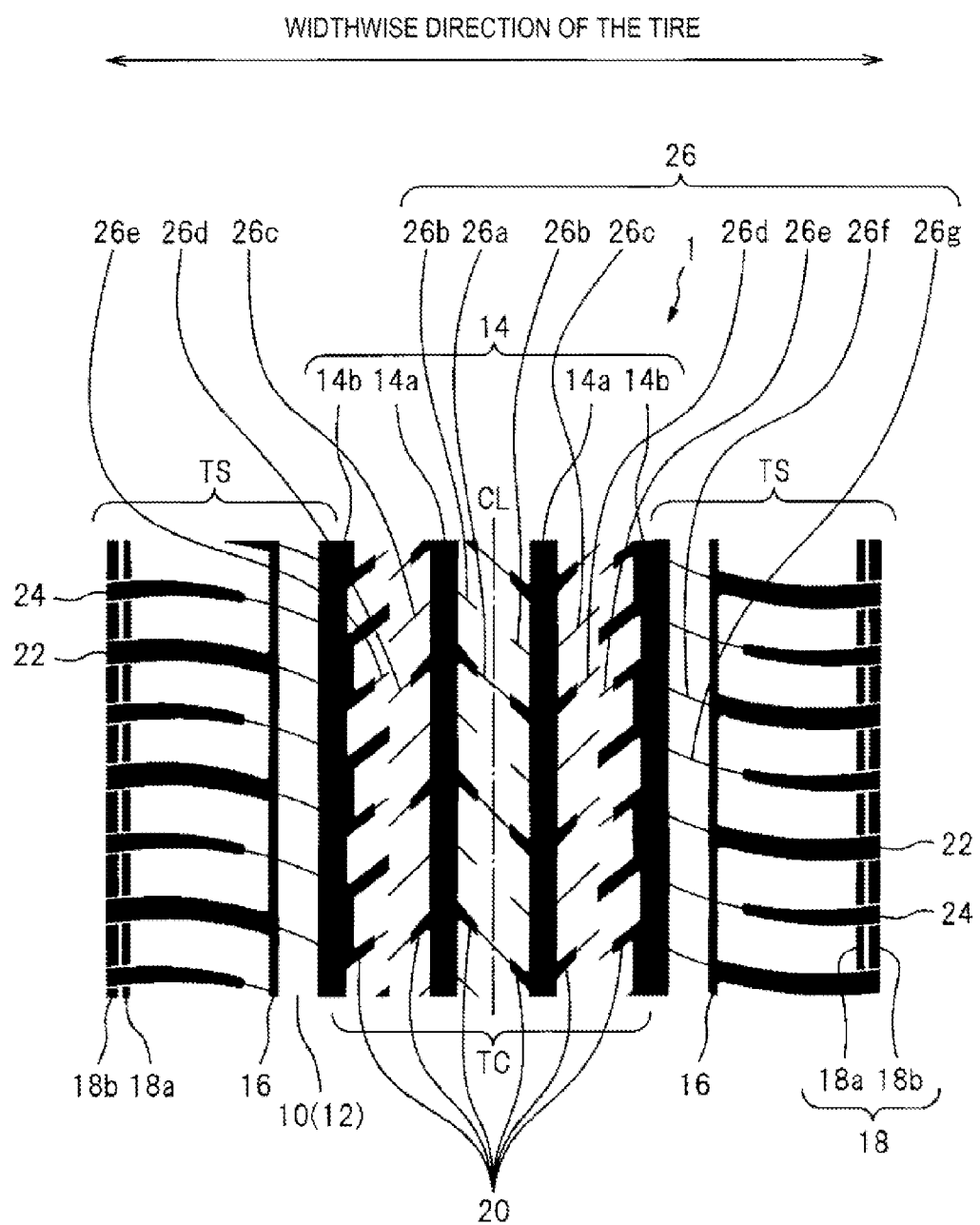
FIG. 1 is a plan view of a tread portion of a pneumatic tire according to an embodiment of the present technology.

Embodiments of the pneumatic tire according to the present technology (including a Basic Embodiment and Additional Embodiments 1 to 3) will now be described based on the drawing. Note that these embodiments are not intended to limit the present technology. Furthermore, the constituents of the embodiments include constituents that can be easily replaced by those skilled in the art, and constituents that are substantially the same. In addition, those skilled in the art can combine the various modes included in the embodiments as desired within the range of obviousness.

[Basic Embodiment]

A basic embodiment of the pneumatic tire according to the present technology will now be described.

In the following description, "radial direction of the tire" refers to a direction orthogonal to the axis of rotation of the pneumatic tire; "inside in the radial direction of the tire" refers to a side that is near to the axis of rotation in the radial direction of the tire; and "outside in the radial direction of the tire" refers to a side that is far from the axis of rotation in the radial direction of the tire. The "circumferential direction of the tire" refers to a circumferential direction with the rotational axis as the center axis. Additionally, "widthwise direction of the tire" refers to a direction parallel to the axis of rotation; "inside in the widthwise direction of the tire" refers to a side that is near to a tire equatorial plane CL (tire equator line) in the widthwise direction of the tire; and "outside in the widthwise direction of the tire" refers to a side that is far from the tire equatorial plane CL in the widthwise direction of the tire. Note that "tire equatorial plane CL" refers to a plane that is orthogonal to the axis of rotation of the pneumatic tire and that passes through the center of the breadth of the pneumatic tire.

FIG. 1 is a plan view of a tread portion of a pneumatic tire according to an embodiment of the present technology. The pneumatic tire 1 illustrated in the drawing comprises a tread portion 10. The tread portion 10 is formed from a rubber material (tread rubber), is exposed on the outermost side in the radial direction of the tire of the pneumatic tire 1, and the surface thereof constitutes the outline profile of the pneumatic tire 1. The surface of the tread portion 10 forms a tread surface 12 constituting the surface that contacts the road surface when a vehicle (not illustrated) upon which the pneumatic tire 1 is mounted is traveling.

As illustrated in FIG. 1, the tread surface 12 is provided with grooves 14, 16, 18 that extend in the circumferential direction of the tire, tire widthwise directional grooves 20, 22, 24 that are oblique with respect to the circumferential direction of the tire, and sipes 26, thereby forming the tread pattern illustrated in the drawing. The specific configuration of the grooves 14 to 24 and the sipes 26 are as follows. The following description of the grooves 14 to 24 and the sipes 26 is for one side of the tire equatorial plane CL, but the same configuration is applied to the other side thereof in the example illustrated in FIG. 1.

Specifically, the tread surface 12 is provided with circumferential primary grooves 14 (circumferential primary groove 14a on the inner side in the widthwise direction of the tire and circumferential primary groove 14b on the outer side in the widthwise direction of the tire) that extend in the circumferential direction of the tire. Circumferential secondary groove 16 that is narrower than the circumferential primary grooves 14a, 14b is provided on the outer side of the circumferential primary groove 14b in the widthwise direction of the tire. Discontinuous grooves 18 (discontinuous groove 18a on the inner side in the widthwise direction of the tire and discontinuous groove 18b on the outer side in the widthwise direction of the tire), with a narrowness similar to that of the circumferential secondary groove 16, are provided farther to the outer side than the circumferential secondary grooves 16 in the widthwise direction of the tire and discontinuously extend in the circumferential direction of the tire. As shown in FIG. 1, circumferential primary grooves 14a and 14b are linear grooves.

The tread surface 12 is provided with a plurality of branch grooves 20 that extend from the circumferential primary grooves 14a, 14b to at least one side thereof in the widthwise direction of the tire, terminate within land portions circumferential ribs adjacent to the circumferential primary grooves 14a, 14b, and are oblique with respect to the circumferential direction of the tire. Widthwise directional main grooves 22 are provided that connect with the circumferential secondary groove 16 and the discontinuous groove 18b and extend substantially in the widthwise direction of the tire. Widthwise directional secondary grooves 24 that extend to the inner side in the widthwise direction of the tire from the discontinuous groove 18b, terminate in the land portions, and are narrower than the widthwise directional main grooves 22 are provided in alternation with the widthwise directional main grooves 22 along the circumferential direction of the tire.

Sipes 26a that connect the branch grooves 20 and sipes 26b that extend on the inner side from the circumferential primary grooves 14a in the widthwise direction of the tire and terminate within the land portions are alternately provided along the circumferential direction of the tire between the circumferential primary grooves 14a, 14a. Sipes 26c that extend outward in the widthwise direction of the tire from the branch grooves 20 connecting to the circumferential primary grooves 14a in the same direction as the branch grooves 20, sipes 26d that extend from the circumferential primary grooves 14a in the same direction as the sipes 26c, and sipes 26e that extend from the inside ends in the widthwise direction of the tire of the branch grooves 20 connecting to the circumferential primary grooves 14b in the same direction as the branch grooves 20 are regularly provided along the circumferential direction of the tire between the circumferential primary grooves 14a, 14b. Sipes 26f that extend from the circumferential primary groove 14b to the widthwise directional main grooves 22 and sipes 26g that extend from the circumferential primary groove 14b to the widthwise directional secondary grooves 24 are alternately provided along the circumferential direction of the tire on the outer side of the circumferential primary groove 14b in the widthwise direction of the tire.

Assuming the arrangement described above, the area to both sides of the tire equatorial plane CL and on the inner side in the widthwise direction of the tire of the tire widthwise directional center lines of the circumferential primary grooves 14b on the outermost side in the widthwise direction of the tire, of the example illustrated in FIG. 1 is the tread center portion TC. The areas from the tire widthwise directional center lines of the circumferential primary grooves 14b on the outermost side in the widthwise direction of the tire to the tread end portions on the outer side in the widthwise direction of the tire are tread shoulder portions TS.

In the present embodiment, there are at least three pitch variations in the tread center portion TC in terms of pitch length in the circumferential direction of the tire in the regions formed by the branch grooves 20 and the land portions adjacent to the branch grooves 20 to one side thereof in the circumferential direction of the tire.

Figure 2:
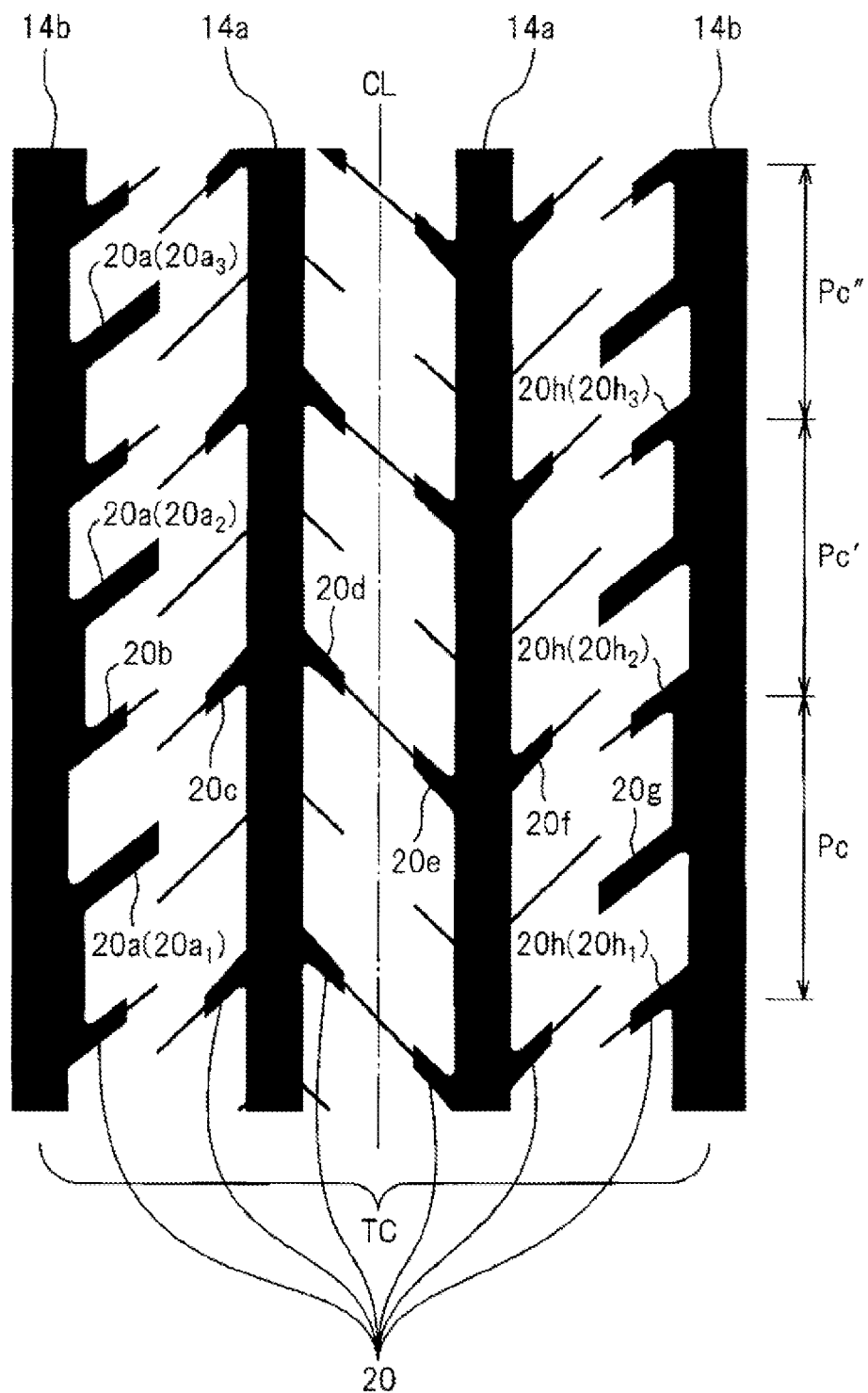
FIG. 2 is a magnified plan view of a tread center portion TC of the tread portion depicted in FIG. 1.

FIG. 2 is a magnified plan view of a tread center portion TC of the tread portion illustrated in FIG. 1. The manner in which the grooves are arranged in FIG. 2 (especially, the ratios of the lengths thereof with respect to the circumferential direction of the tire) is not accurately reflected in FIG. 1; rather, the arrangement of the grooves in the tread center portion TC is as illustrated in FIG. 2. In the example illustrated in FIG. 2, the pitch lengths with respect to the circumferential direction of the tire in the tread center portion TC are the dimensions of any one of the branch grooves 20a (20a1, 20a2, . . . ) in the circumferential direction of the tire; for example, in the case of branch groove 20a1, the pitch length is the length from the center point with respect to the circumferential direction of the tire of the branch groove 20a1 at the innermost end thereof with respect to the widthwise direction of the tire to the center point with respect to the circumferential direction of the tire of the branch groove 20a2, which is adjacent to the branch groove 20a1 in the circumferential direction of the tire and is identically shaped, at the innermost end thereof with respect to the widthwise direction of the tire.

The branch grooves 20 constituting the standard used to define the pitch lengths in the circumferential direction of the tire are not limited to the branch grooves 20a illustrated in FIG. 2; any of the other branch grooves 20b, 20c, 20d, 20e, 20f, 20g, 20h illustrated in the same drawing may also be used.

In the example illustrated in FIG. 2, there are at least three pitch variations in the tread center portion TC. For example, if the branch grooves 20h (branch groove 20h1, branch groove 20h2, branch groove 20h3) are used as the standard branch grooves, there are three pitches: pitch Pc (standard: branch groove 20h1), pitch Pc' (standard: branch groove 20h2), and pitch Pc" (standard: branch groove 20h3).

In the present embodiment, taking n as the pitch count, the pitch lengths $Pc1, Pc2, Pc3, \ldots, Pcn$ in order from longest to shortest satisfy the relationships $Pc1/Pc2 \geq Pc2/Pc3 \geq, \ldots, \geq Pcn-1/Pcn$ (condition 1) and $Pc1/Pc2 > Pcn-1/Pcn$ (condition 2). In the example illustrated in FIG. 2, the pitches from longest to shortest are pitch Pc, pitch Pc', and pitch Pc"; thus, Pc corresponds to pitch Pc1, Pc' corresponds to pitch Pc2, and Pc" corresponds to pitch Pc3, and the relationships Pc/Pc'≥Pc'/Pc" and Pc/Pc'>Pc'/Pc", or simply Pc/Pc'>Pc'/Pc", hold true.

As described above, a plurality of circumferential pitch lengths is defined in the tread center portion TC of the pneumatic tire 1 illustrated in FIG. 1, on the basis of which multiple quotients (results of division) of pitch lengths of adjacent values are calculated therefor, and the relative sizes of these quotients are defined. The relative sizes of the quotient for the maximum pitch length and the quotient for the minimum pitch length are also defined on the basis of the plurality of circumferential pitch lengths. More specifically, the lengths are defined so that the quotient of circumferential pitch lengths of adjacent values are larger for longer circumferential pitch lengths and, conversely, smaller for shorter circumferential pitch lengths. The quotient for the maximum pitch length is defined to be greater than that for the minimum pitch length.

In other words, conditions 1 and 2 described above increase the length of the minimum pitch length and decrease the length of the maximum pitch length in the tread center portion TC, thereby suppressing differences in pitch length through the circumferential direction of the tire as a whole and reducing differences in rigidity. As a result, steering stability and rolling resistance on dry road surfaces can be improved.

In the pneumatic tire 1 illustrated in FIG. 1, modifications have only been made to the pitch length ratios based on the pitch lengths, and not to factors other than pitch length. Specifically, the pneumatic tire 1 illustrated in FIG. 1 is not obtained by specifying factors other than pitch length, such as the angles of inclination, areas, or widths of the lateral grooves, as in the conventional art involving pitch variations (for example, Patent Documents 1 and 3). As a result, the pneumatic tire illustrated in FIG. 1 can be obtained without the need for a complicated design.

As discussed above, the pneumatic tire according to the present embodiment allows for improved steering stability and rolling resistance on dry road surfaces without the need for a complicated design simply by controlling the plurality of circumferential pitch lengths in the tread center portion.

Although it is not illustrated in the drawings, the pneumatic tire according to the present embodiment described above has a meridian cross-section form similar to that of a conventional pneumatic tire. Here, the meridian cross-section form of the pneumatic tire refers to the cross-sectional shape of the pneumatic tire on a plane normal to the tire equatorial plane. As seen in meridian cross-section, the pneumatic tire according to the present embodiment comprises bead portions, sidewall portions, and a tread portion from inside to outside in the radial direction of the tire. As seen, for example, in meridian cross-section, the pneumatic tire is provided with a carcass layer that extends from the tread portion to the bead portions on both sides and is wound around a pair of bead cores, and a belt layer and a belt reinforcing layer upon the carcass layers in that order outward in the radial direction of the tire.

The pneumatic tire according to the present embodiment can be obtained via ordinary manufacturing steps; i.e., a tire material mixing step, a tire material machining step, a green tire molding step, a vulcanization step, a post-vulcanization inspection step, etc. In particular, when manufacturing the pneumatic tire according to the present embodiment, recesses and protrusions corresponding to the desired pitch variations are formed on the inner wall of the vulcanization mold, which is used to perform vulcanization.

[Additional Embodiments]

Next, descriptions are made of Additional Embodiments 1 to 3 which can be optionally implemented as opposed to Basic Embodiment of the pneumatic tire according to the present technology described above.

(Additional Embodiment 1)

Additional embodiment 1 features further modifications to the tread shoulder portion TS over the basic embodiment. Specifically, in the present embodiment, the tread shoulder portions TS of the example illustrated in FIG. 1 comprise at least three pitch variations in terms of pitch lengths in the circumferential direction of the tire in the regions formed by the widthwise directional main grooves 22 and the land portions adjacent to the widthwise directional main grooves 22 to one side thereof in the circumferential direction of the tire.

Figure 3:
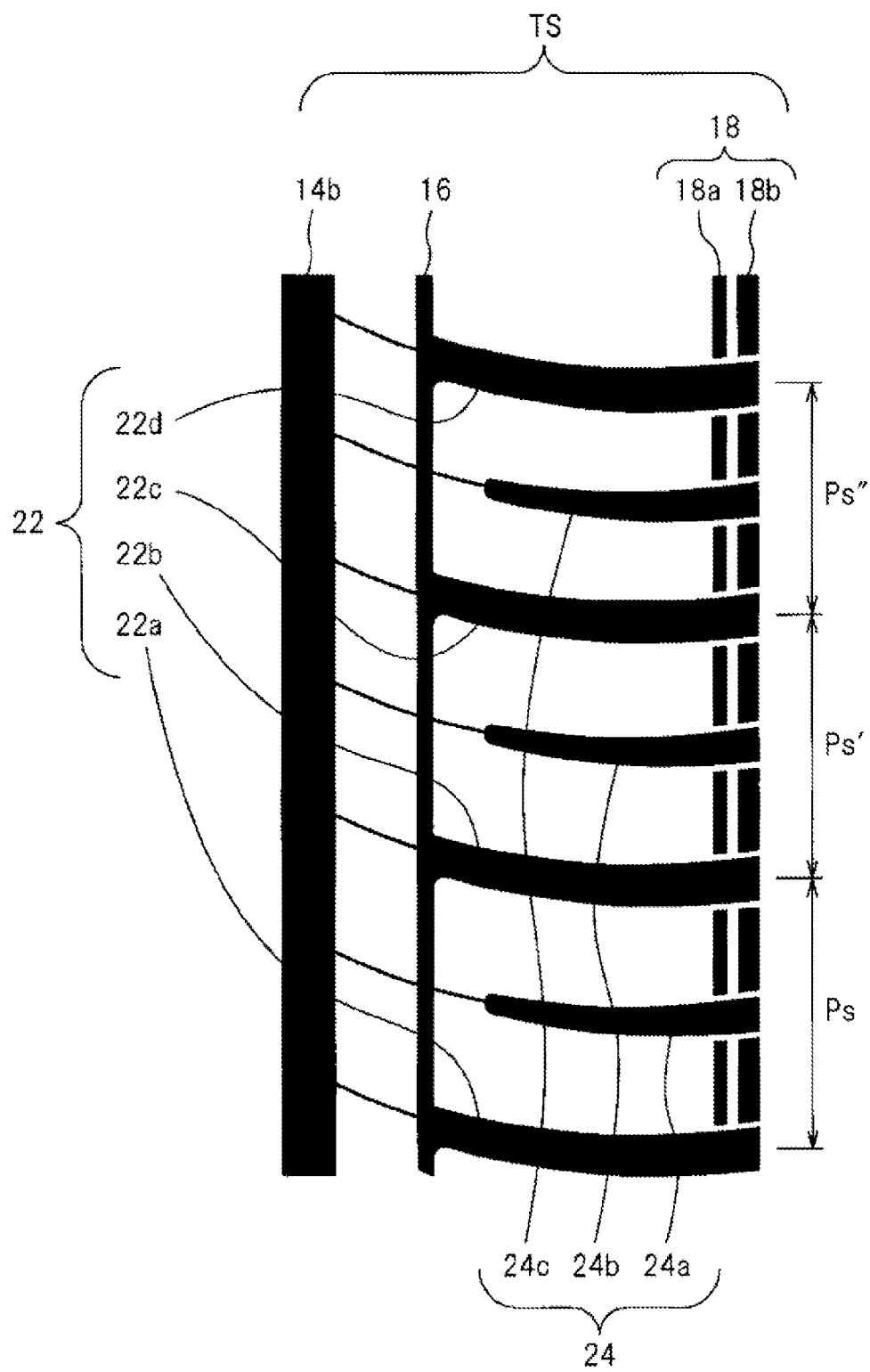
FIG. 3 is a magnified plan view of a tread shoulder portion TS (on the right side in FIG. 1) of the tread portion depicted in FIG. 1.

FIG. 3 is a magnified plan view of a tread shoulder portion TS of the tread portion illustrated in FIG. 1. The manner in which the grooves are arranged in FIG. 3 (especially, the ratios of the lengths thereof with respect to the circumferential direction of the tire) is not accurately reflected in FIG. 1; rather, the arrangement of the grooves in the tread shoulder portions TS is as illustrated in FIG. 3. In the example illustrated in FIG. 3, the pitch lengths with respect to the circumferential direction of the tire in the tread shoulder portion TS are the dimensions of one of the widthwise directional main grooves 22 (22a, 22b, 22c, 22d) in the circumferential direction of the tire; for example, in the case of the widthwise directional main groove 22a, the pitch length is the length from the center point with respect to the circumferential direction of the tire of the widthwise directional main groove 22a at the outermost end thereof with respect to the widthwise direction of the tire to the center point with respect to the circumferential direction of the tire of the widthwise directional main groove 22b, which is adjacent to the widthwise directional main groove 22a in the circumferential direction of the tire and is identically shaped, at the outermost end thereof with respect to the widthwise direction of the tire.

The grooves constituting the standard used to define the pitch lengths in the circumferential direction of the tire are not limited to the widthwise directional main grooves 22 illustrated in FIG. 3; the widthwise directional secondary grooves 24 (24a, 24b, 24c) illustrated in the same drawing may also be used.

In the example illustrated in FIG. 3, there are at least three pitch variations in the tread shoulder portions TS. If, for example, the widthwise directional main grooves 22 (widthwise directional main grooves 22a, 22b, 22c) are used as the reference grooves, there are three pitches: pitch Ps (standard: widthwise directional main groove 22a), pitch Ps' (standard: widthwise directional main groove 22b), and pitch Ps" (standard: widthwise directional main groove 22c).

In the present embodiment (additional embodiment 1), assuming the pitch count is n and the various pitch lengths Ps from longest to shortest are Ps1, Ps2, Ps3, . . . , Psn, the relationships Ps1/Ps2≤Ps2/Ps3≤, . . . , ≤Psn−1/Psn (condition 3) and Ps1/Ps2<Psn−1/Psn (condition 4) hold true. In the example illustrated in FIG. 3, the pitch lengths from longest to shortest are pitch Ps, pitch Ps', and pitch Ps"; thus, Ps corresponds to Ps1, Ps' corresponds to pitch Ps2, and Ps" corresponds to pitch Ps3, and the relationships Ps/Ps'≤Ps'/Ps" and Ps/Ps'<Ps'/Ps", or simply Ps/Ps'<Ps'/Ps", hold true.

In the present embodiment (additional embodiment 1), as described above, a plurality of circumferential pitch lengths is defined in the tread shoulder portions TS of the pneumatic tire 1 illustrated in FIG. 1, on the basis of which multiple quotients (results of division) of pitch lengths of adjacent values are calculated therefor, and the relative sizes of these quotients are defined. The relative sizes of the quotient for the maximum pitch length and the quotient for the minimum pitch length are also defined on the basis of the plurality of circumferential pitch lengths. More specifically, the lengths are defined so that the quotient of circumferential pitch lengths of adjacent values are smaller for longer circumferential pitch lengths and, conversely, larger for shorter circumferential pitch lengths. The quotient for the maximum pitch length is defined to be less than that for the minimum pitch length.

In other words, conditions 3 and 4 described above decrease the length of the minimum pitch length and increases the maximum pitch length in the tread shoulder portions TS, thereby creating variations in the plurality of pitch lengths. As a result, noise performance can be improved.

In the pneumatic tire 1 according to the present embodiment (additional embodiment 1), the minimum pitch length Pcn in the tread center portion TC and the minimum pitch length Psn in the tread shoulder portion TS preferably satisfy the relationship Pcn>Psn. For example, it is preferable that the relationship Pc">Ps" hold true in the example illustrated in FIGS. 2 and 3.

Ordinarily, in either the tread center portion TC or the tread shoulder portions TS, the area of the tire widthwise directional grooves (the branch grooves 20 and widthwise grooves 22, 24 illustrated in FIG. 1) will increase as the number of portions having short pitch lengths increases, leading to a tendency toward reduced rigidity in those positions in particular. In order to enhance steering stability and rolling resistance on dry road surfaces, it is efficient for the tread center portion TC, which makes the greatest contribution to the ground contact patch, to have a higher rigidity than the tread shoulder portions TS. The portion of the tread center portion TC having low rigidity compared to the tread shoulder portions TS can be reduced by making the minimum pitch length Pcn in the tread center portion TC greater than the minimum pitch length Psn in the tread shoulder portion TS. As a result, steering stability and rolling resistance on dry road surfaces in particular are greatly improved.

In the pneumatic tire 1 according to the present embodiment (additional embodiment 1), it is additionally preferable for the total number of pitches having pitch length Pc1 on the tire circumference to be less than the total number of pitches having pitch length Pcn on the tire circumference in the tread center portion TC. As a result, it is possible, when adjusting the locations of minimum pitch length, i.e., the sections of lowest rigidity, between the tread center portion TC and the tread shoulder portions TS, to concentrate more of the adjusted sections in the tread center portion TC, thereby reducing differences in rigidity on the tire circumference. As a result, steering stability and rolling resistance on dry road surfaces in particular are greatly improved.

Similarly, in the pneumatic tire 1 according to the present embodiment (additional embodiment 1), it is preferable for the total number of pitches having pitch length Ps1 on the tire circumference to be less than the total number of pitches having pitch length Psn on the tire circumference in the tread shoulder portions TS. As a result, it is possible, when adjusting the locations of minimum pitch length, i.e., the sections of lowest rigidity, between the tread center portion TC and the tread shoulder portions TS, to concentrate more of the adjusted sections in the tread shoulder portions TS, thereby reducing differences in rigidity around the tire circumference. As a result, steering stability and rolling resistance on dry road surfaces in particular are greatly improved.

(Additional Embodiment 2)

In additional embodiment 2, further modifications are made to the tread center portion TC and/or the tread shoulder portions TS over the basic embodiment (and additional embodiment 1). Specifically, in the example illustrated in FIG. 1, assuming a pitch count of n, it is preferable for the pitch length ratio $Pck-1/Pck$ in the tread center portion TC (k being at least one natural number from 2 to n; hereinafter, also referred to as the "center portion adjacent pitch length ratio") and/or the pitch length ratio $Psk-1/Psk$ in the tread shoulder portion TS (k being at least one natural number from 2 to n; hereinafter, also referred to as the "shoulder portion adjacent pitch length ratio") to be in a range from 1.05 to 1.20 (additional embodiment 2).

Having the center portion adjacent pitch length ratio and/or the shoulder portion pitch length ratio be at least 1.05 allows a certain degree of difference in dimensions to be imparted to close pitch lengths in the portions TC, TS to which this value is applied. This disperses the frequency of the noise produced in the portions TC, TS, allowing for the suppression of the amplification of noise in the same frequency band. As a result, it is possible to reduce noise in the tread center portion TC and/or the tread shoulder portions TS, allowing for improved noise performance.

Having the center portion adjacent pitch length ratio and/or the shoulder portion pitch length ratio be not more than 1.20 keeps the difference in dimensions between close pitch lengths in the portions TC, TS to which this value is applied from being greater than necessary. This allows localized reductions in rigidity in the portions TC, TS to be suppressed. As a result, steering stability and rolling resistance on dry road surfaces can be improved in the tread center portion TC and/or the tread shoulder portions TS.

(Additional Embodiment 3)

In additional embodiment 3, further modifications are made to the tread center portion TC and/or the tread shoulder portions TS over the basic embodiment (and additional embodiments 1 and/or 2). Specifically, in the example illustrated in FIG. 1, it is preferable for the ratio $Pc1/Pcn$ of the maximum pitch length Pc1 and the minimum pitch length Pcn along the tire circumference in the tread center portion TC (hereinafter, also referred to as the "center portion maximum/minimum pitch length ratio") and/or the ratio $Ps1/Psn$ of the maximum pitch length Ps1 and the minimum pitch length Psn along the tire circumference in the tread shoulder portions TS (hereinafter, also referred to as the "shoulder portion maximum/minimum pitch length ratio") to be in a range from 1.20 to 2.00 (additional embodiment 3).

Having the center portion maximum/minimum pitch length ratio and/or the shoulder portion maximum/minimum pitch length ratio be at least 1.20 allows the portions TC, TS to which this value is applied to be imparted with variation among the various pitch lengths. This disperses the frequency of the noise produced in the portions TC, TS, allowing for the suppression of the amplification of noise in the same frequency band. As a result, it is possible to reduce noise in the tread center portion TC and/or the tread shoulder portions TS, allowing for improved noise performance.

Having the center portion maximum/minimum pitch length ratio and/or the shoulder portion maximum/minimum pitch length ratio be not more than 2.00 keeps variation among the various pitch lengths in the portions TC, TS to which this value is applied from being greater than necessary. This allows localized reductions in rigidity in the portions TC, TS to be suppressed. As a result, steering stability and rolling resistance on dry road surfaces can be improved in the tread center portion TC and/or the tread shoulder portions TS.

EXAMPLES

Pneumatic tires of size 215/45R17 87W having the tread pattern illustrated in FIGS. 1 to 3, a pitch count of 5, and center portion pitch length ratios (pitch ratio Ce), shoulder portion pitch length ratios (pitch ratios Sh), center portion maximum/minimum pitch length ratios (max./min. pitch ratio Ce), and shoulder portion maximum/minimum pitch length ratios (max./min. pitch ratio Sh) as shown in Table 1 according to a Conventional Example and Working Examples 1 to 7 were prepared.

The prepared tires were assembled on 17×7J rims at an air pressure of 230 kPa, mounted on a sedan vehicle having an displacement volume of 1,800 CC (front engine/front drive), and evaluated for steering stability, rolling resistance, and noise performance. The results are shown on Table 1.

(Steering Stability)

For steering stability, a panel performed a sensory evaluation when driving on a dry road surface at a speed of 120 km/h. Then, index evaluation was carried out based on the measured results using Conventional Example as standard (100). Higher index values indicate better steering stability.

(Rolling Resistance)

Rolling resistance value was measured according to ISO standards. Then, index evaluation was carried out based on the measured results using Conventional Example as standard (100). Higher index values indicate lower rolling resistance.

(Noise Performance)

For noise performance, an overall value was measured while traveling at 100 km/h on a smooth road surface, and index evaluation was carried out based on the measured results using Conventional Example as standard (100). Higher index values indicate better noise performance.

pitch length and the pitch length ratio for the minimum pitch length (relative sizes of Pc1/Pc2 and Pc4/Pc5) fall within the prescribed range), all exhibit better steering stability, rolling resistance, and noise performance than the pneumatic tire according to the Conventional Example, which does not fall within the technical scope of the present technology.

The present technology encompasses the following aspects.

(1) A pneumatic tire comprising: at least two main grooves extending in a circumferential direction and a plurality of tire widthwise directional grooves that intersect the main grooves in a tire tread portion, wherein a region on an inner side in a widthwise direction of the tire of tire widthwise directional center lines of the outermost main grooves with respect to the widthwise direction of the tire constitutes a tread center portion, and regions from the tire widthwise directional center lines of the outermost main grooves with respect to the widthwise direction of the tire to tread end portions at outer ends in the widthwise direction of the tire constitute tread shoulder portions, the tread center portion has at least three pitch variations in terms of pitch length in the circumferential direction of the tire in regions formed by the tire widthwise directional grooves and land portions adjacent to the tire widthwise directional grooves to one side in the circumferential direction of the tire, and, taking n as pitch count and labeling the respective pitch lengths Pc from longest to shortest as Pc1, Pc2, Pc3, . . . , Pcn, the relationships Pc1/Pc2≥Pc2/Pc3≥, . . . , ≥Pcn−1/Pcn and Pc1/Pc2>Pcn−1/Pcn hold true.

(2) The pneumatic tire according to (1), wherein there are at least three pitch variations in terms of pitch length in the circumferential direction of the tire in the regions formed by the tire widthwise directional grooves and the land portions adjacent to the tire widthwise directional grooves to one side in the circumferential direction of the tire in the tread shoulder portions, and, taking n as the pitch count and labeling the respective pitch lengths Ps in order from longest to shortest as Ps1, Ps2, Ps3, . . . , Psn, the relationships Ps1/Ps2≤Ps2/Ps3≤, . . . , ≤Psn−1/Psn and Ps1/Ps2<Psn−1/Psn hold true.

TABLE 1

| | | Conventional Example | Working Example 1 | Working Example 2 | Working Example 3 | Working Example 4 | Working Example 5 | Working Example 6 | Working Example 7 |
|---|---|---|---|---|---|---|---|---|---|
| Pitch ratio Ce | Pc1/Pc2 | 1.05 | 1.16 | 1.16 | 1.16 | 1.16 | 1.16 | 1.22 | 1.16 |
| | Pc2/Pc3 | 1.05 | 1.13 | 1.13 | 1.13 | 1.13 | 1.13 | 1.16 | 1.13 |
| | Pc3/Pc4 | 1.05 | 1.10 | 1.10 | 1.10 | 1.10 | 1.10 | 1.10 | 1.10 |
| | Pc4/Pc5 | 1.05 | 1.06 | 1.06 | 1.06 | 1.06 | 1.06 | 1.03 | 1.06 |
| | Pc1/Pc5 | 1.21 | 1.53 | 1.53 | 1.53 | 1.53 | 1.53 | 1.60 | 1.53 |
| Pitch ratio Sh | Ps1/Ps2 | 1.05 | 1.06 | 1.06 | 1.06 | 1.06 | 1.06 | 1.06 | 1.03 |
| | Ps2/Ps3 | 1.05 | 1.10 | 1.10 | 1.10 | 1.10 | 1.10 | 1.10 | 1.10 |
| | Ps3/Ps4 | 1.05 | 1.13 | 1.13 | 1.13 | 1.13 | 1.13 | 1.13 | 1.16 |
| | Ps4/Ps5 | 1.05 | 1.16 | 1.10 | 1.16 | 1.16 | 1.16 | 1.16 | 1.22 |
| | Ps1/Ps5 | 1.21 | 1.53 | 1.50 | 1.53 | 1.53 | 1.53 | 1.53 | 1.60 |
| Max./min. pitch ratio Ce | | 1.50 | 1.50 | 1.50 | 1.50 | 1.15 | 2.05 | 2.00 | 1.50 |
| Max./min. pitch ratio Sh | | 1.50 | 1.50 | 1.30 | 1.50 | 1.15 | 2.05 | 1.50 | 2.00 |
| Steering stability | | 100 | 110 | 107 | 105 | 113 | 103 | 105 | 103 |
| Rolling resistance | | 100 | 110 | 107 | 105 | 113 | 103 | 105 | 103 |
| Noise performance | | 100 | 107 | 103 | 104 | 102 | 110 | 102 | 104 |

It is apparent from Table 1 that the pneumatic tires of Working Examples 1 to 7, which fall within the technical scope of the present technology (i.e., the pitch ratio Ce and the relative sizes of the pitch length ratio for the maximum (3) The pneumatic tire according to (2), wherein the minimum pitch length Pcn in the tread center portion and the minimum pitch length Psn in the tread shoulder portions satisfy the relationship Pcn>Psn.

(4) The pneumatic tire according to (2) or (3), where the total number of pitches having pitch length Pc1 along the tire circumference in the tread center portion is less than the total number of pitches having pitch length Pcn along the tire circumference.

(5) The pneumatic tire according to any one of (2) to (4), wherein the total number of pitches having pitch length Ps1 along the tire circumference in the tread shoulder portions is less than the total number of pitches having pitch length Psn along the tire circumference.

(6) The pneumatic tire according to any one of (1) to (5), wherein, taking n as the pitch count, the pitch length ratio Pck−1/Pck in the tread center portion (k being at least one natural number from 2 to n) and/or the pitch length ratio Psk−1/Psk in the tread shoulder portions (k being at least one natural number from 2 to n) is in a range from 1.05 to 1.20.

(7) The pneumatic tire according to any one of (1) to (6), wherein the ratio Pc1/Pcn of the maximum pitch length Pc1 to the minimum pitch length Pcn along the tire circumference in the tread center portion and/or the ration Ps1/Psn of the maximum pitch length Ps1 to the maximum pitch length Psn along the tire circumference in the tread shoulder portions is in a range from 1.20 to 2.00.

What is claimed is:

1. A pneumatic tire comprising:
at least two main grooves extending in a circumferential direction;
a plurality of tire widthwise directional grooves that intersect the main grooves in a tire tread portion, wherein the tire widthwise directional grooves are terminal grooves branched off from one of the at least two main grooves;
a region on an inner side in a widthwise direction of the tire of tire widthwise directional center lines of outermost main grooves with respect to the widthwise direction of the tire constituting a tread center portion, and regions from the tire widthwise directional center lines of the outermost main grooves with respect to the widthwise direction of the tire to tread end portions at outer ends in the widthwise direction of the tire constituting tread shoulder portions; and
the tread center portion having at least three pitch variations in terms of pitch length in the circumferential direction of the tire in regions formed by the tire widthwise directional grooves and land portions adjacent to the tire widthwise directional grooves to one side in the circumferential direction of the tire, and, taking n as pitch count and labeling respective pitch lengths Pc from longest to shortest as Pc1, Pc2, Pc3, . . . , Pcn, relationships Pc1/Pc2≥Pc2/Pc3≥, . . . , ≥Pcn−1/Pcn and Pc1/Pc2>Pcn−1/Pcn holding true;
wherein there are at least three pitch variations in terms of pitch length in the circumferential direction of the tire in the regions formed by tire widthwise directional grooves and the land portions adjacent to the tire widthwise directional grooves to one side in the circumferential direction of the tire in the tread shoulder portions, and, taking n as the pitch count and labeling the respective pitch lengths Ps in order from longest to shortest as Ps1, Ps2, Ps3, . . . , Psn, relationships Ps1/Ps2≤Ps2/Ps3≤, . . . , ≤Psn−1/Psn and Ps1/Ps2<Psn−1/Psn holding true.

2. The pneumatic tire according to claim 1, wherein a minimum pitch length Pcn in the tread center portion and a minimum pitch length Psn in the tread shoulder portions satisfy the relationship Pcn>Psn.

3. The pneumatic tire according to claim 2, where a total number of pitches having pitch length Pc1 along a tire circumference in the tread center portion is less than a total number of pitches having pitch length Pcn along the tire circumference.

4. The pneumatic tire according to claim 3, wherein a total number of pitches having a pitch length Ps1 along the tire circumference in the tread shoulder portions is less than the pitch count for Psn along the tire circumference.

5. The pneumatic tire according to claim 4, wherein, taking n as the pitch count, at least one selected from the group consisting of a pitch length ratio Pck−1/Pck in the tread center portion (k being at least one natural number from 2 to n) and a pitch length ratio Psk−1/Psk in the tread shoulder portions (k being at least one natural number from 2 to n) is in a range from 1.05 to 1.20.

6. The pneumatic tire according to claim 5, wherein at least one selected from the group consisting of a ratio Pc1/Pcn of a maximum pitch length Pc1 to a minimum pitch length Pcn along the tire circumference in the tread center portion and the ratio Ps1/Psn of a maximum pitch length Ps1 to a minimum pitch length Psn along the tire circumference in the tread shoulder portions is in a range from 1.20 to 2.00.

7. The pneumatic tire according to claim 2, wherein a total number of pitches having pitch length Ps1 along a tire circumference in the tread shoulder portions is less than a total number of pitches having pitch length Psn along the tire circumference.

8. The pneumatic tire according to claim 7, wherein, taking n as the pitch count, at least one selected from the group consisting of a pitch length ratio Pck−1/Pck in the tread center portion (k being at least one natural number from 2 to n) and a pitch length ratio Psk−1/Psk in the tread shoulder portions (k being at least one natural number from 2 to n) is in a range from 1.05 to 1.20.

9. The pneumatic tire according to claim 8, wherein at least one selected from the group consisting of a ratio Pc1/Pcn of a maximum pitch length Pc1 to a minimum pitch length Pcn along the tire circumference in the tread center portion and the ratio Ps1/Psn of a maximum pitch length Ps1 to a minimum pitch length Psn along the tire circumference in the tread shoulder portions is in a range from 1.20 to 2.00.

10. The pneumatic tire according to claim 1, where a total number of pitches having pitch level Pc1 along a tire cicumference in the tread center portion is less than a total number of pitches having a pitch length Pcn along the tire circumference.

11. The pneumatic tire according to claim 1, wherein a total number of pitches having pitch length Ps1 along a tire circumference in the tread shoulder portions is less than a total number of pitches having pitch length in the tread shoulder portions is less than a total number of pitches having pitch length Psn along the tire circumference.

12. The pneumatic tire according to claim 1, wherein, taking n as the pitch count, at least one selected from the group consisting of a pitch length ratio Pck−1/Pck in the tread center portion (k being at least one natural number from 2 to n) and a pitch length ratio Psk−1/Psk in the tread shoulder portions (k being at least one natural number from 2 to n) is in a range from 1.05 to 1.20.

13. The pneumatic tire according to claim 1, wherein at least one selected from the group consisting of a ratio Pc1/Pcn of a maximum pitch length Pc1 to a minimum pitch length Pcn along a tire circumference in the tread center portion and the ratio Ps1/Psn of a maximum pitch length Ps1 to a minimum pitch length Psn along the tire circumference in the tread shoulder portions is in a range from 1.20 to 2.00.

14. The pneumatic tire according to claim 1, wherein the at least two main grooves are linear grooves.

15. The pneumatic tire according to claim 1, wherein the tire widthwise directional grooves in the tread center portion are oblique to the tire circunferential direction.

16. The pneumatic tire according to claim 1, wherein the tire widthwise directional grooves in the tread center portion are formed in a circumferential rib.

\* \* \* \* \*